United States Patent
Togashi

(10) Patent No.: US 7,602,601 B2
(45) Date of Patent: Oct. 13, 2009

(54) MULTILAYER CAPACITOR, MANUFACTURING METHOD THEREOF

(75) Inventor: Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 118 days.

(21) Appl. No.: 11/976,177

(22) Filed: Oct. 22, 2007

(65) Prior Publication Data
US 2008/0100987 A1  May 1, 2008

(30) Foreign Application Priority Data
Oct. 31, 2006  (JP) .............................. 2006-295682

(51) Int. Cl.
*H01G 4/228* (2006.01)

(52) U.S. Cl. .............. 361/306.3; 361/306.1; 361/321.1; 361/321.2; 361/307; 361/308.1

(58) Field of Classification Search .............. 361/306.3, 361/321.1, 321.2, 311, 312, 313, 306.1, 307, 361/308.1, 306.2
See application file for complete search history.

(56) References Cited

U.S. PATENT DOCUMENTS

| | | | |
|---|---|---|---|
| 6,542,352 B1 * | 4/2003 | Devoe et al. .............. | 361/321.2 |
| 6,657,848 B2 * | 12/2003 | Togashi et al. ............ | 361/306.3 |
| 6,762,925 B2 * | 7/2004 | Uchida et al. ............ | 361/321.1 |
| 6,934,145 B2 * | 8/2005 | Hsieh et al. .............. | 361/321.2 |
| 7,035,079 B1 * | 4/2006 | Park et al. ................ | 361/303 |
| 7,292,430 B2 * | 11/2007 | Lee et al. ................. | 361/306.3 |

FOREIGN PATENT DOCUMENTS

| | | |
|---|---|---|
| JP | A-02-251120 | 10/1990 |
| JP | A-2002-299152 | 10/2002 |
| JP | A-2003-051423 | 2/2003 |
| JP | A-2006-060147 | 3/2006 |
| JP | A-2006-210801 | 8/2006 |

* cited by examiner

*Primary Examiner*—Nguyen T Ha
(74) *Attorney, Agent, or Firm*—Oliff & Berridge, PLC

(57) ABSTRACT

A multilayer capacitor is provided that includes a dielectric body, an internal layer portion, an external layer portion and a first terminal electrode and a second terminal electrode to be set at different electric potentials from each other and formed at least on a side face parallel to stacking direction Z of side faces of the dielectric body. Each of the first terminal electrodes are connected with at least one of the first internal conductor layer and a plurality of the first external conductor layers and each of the second terminal electrodes are connected with at least one of the second internal conductor layer and a plurality of the second external conductor layers. The dielectric layer positioned at the external layer portions comprises a plurality of pin hole conducting portions.

12 Claims, 6 Drawing Sheets

MULTILAYER CAPACITOR, MANUFACTURING METHOD THEREOF

BACKGROUND OF THE INVENTION

1. Field of the Invention

The present invention relates to multilayer capacitor greatly reducing the equivalent serial inductance (ESL) and production method thereof, more particularly relates to a multilayer capacitor used as a decoupling capacitor and manufacturing method thereof.

2. Description of the Related Art

In recent years, while advances have been made in reducing the voltage of power sources used for supplying power to large-scale integrated circuits (LSI's) and other integrated circuits, the load current has increased.

Therefore, it has become extremely difficult to keep fluctuations in the power source voltage to within tolerances when faced with rapid changes in the load current. Therefore, a decoupling capacitor (for example two-terminal structure multilayer ceramic capacitor) is now being connected to a power source. At the time of transitory fluctuation in the load current, current is supplied from this multilayer ceramic capacitor to the LSI of the central processing unit (CPU) etc. to suppress fluctuation of the power source voltage.

Along with the increasingly higher operating frequencies of today's CPU's, however, the fluctuations in the load current have become faster and larger. The equivalent serial inductance (ESL) of the decoupling capacitor itself now has a great impact on fluctuations of the power source voltage.

That is, since the ESL is high in a conventional multilayer ceramic capacitor, fluctuation of the power source voltage V easily becomes greater in the same way as above along with fluctuations in the load current i.

That is because the fluctuations in voltage at the time of transition of the load current are approximated by the following equation 1 and therefore the level of the ESL is related to the magnitude of fluctuation of the power source voltage. Further, from equation 1, reduction in the ESL can be said to be linked with stabilization of the power source voltage.

$$dV = ESL \cdot di/dt \qquad \text{equation 1}$$

where, dV is transitory fluctuation of voltage (V), i is the fluctuation of current (A), and t is the time of fluctuation (sec).

As a multilayer capacitor wherein the ESL is reduced, a multilayer capacitor shown in Japanese Unexamined Patent Publication No. 2003-51423 is known. According to this multilayer capacitor, parasitic inductance can be reduced. As a result, the ESL can be reduced. However, it has been required to further reducing the ESL.

In Japanese Unexamined Patent Publication No. 2006-60147, a two terminal capacitor is shown which comprises conductor layer of an internal layer portion, a dummy conductor layer sandwiching the internal layer portion in stacking direction. The dummy conductor layers, and the dummy conductor layer and terminal electrode are connected via metallic particles in dielectric layer. However, in the two terminal capacitor of the JP Unexamined Patent Publication No. 2006-60147, the effects of reducing the ESL cannot be obtained sufficiently because the metallic particles are used for preventing peeling of terminal electrodes.

Further, as a multilayer capacitor wherein the ESL is reduced, a multi-terminal multilayer capacitor shown in Japanese Unexamined Patent Publication No. 2002-299152 is known. In the multi-terminal multilayer capacitor, by increasing external terminal electrode, current flow varying in direction can be realized in an internal conductor layer. As a result, further reducing of the ESL becomes possible. However, in order to respond the increasingly higher operating frequencies of today's CPU's, in the multi-terminal capacitor, further reducing the ESL is required.

SUMMARY OF INVENTION

An object of the present invention is to provide a multilayer capacitor able to greatly reduce the ESL and manufacturing method thereof.

[Means for Solving Problem]

To attain the above object, there is provided a multilayer capacitor comprising: a dielectric body formed by stacking a plurality of dielectric layers having an approximately rectangular parallelepiped shape; an internal layer portion in which pluralities of first internal conductor layers and second internal conductor layers to be set at different electric potentials each other are stacked alternately in said dielectric body via said dielectric layer as mutually overlapping in stacking direction to form an internal electrode circuit of a capacitor; an external layer portion in which pluralities of first external conductor layers and second external conductor layers to be set at different electric potentials, which are not overlapping in stacking direction, are stacked in said dielectric body via said dielectric layer, the external layer portions being adjacent to at least any of both end faces of said internal layer portion in stacking direction; and a first and a second terminal electrodes to be set at different electric potentials each other, formed at least on side faces of said dielectric body, the side face being parallel to stacking direction; wherein each of the first terminal electrodes is connected with at least one of said first internal conductor layers and a plurality of said first external conductor layers; each of the second terminal electrodes is connected with at least one of said second internal conductor layers and a plurality of said second external conductor layers; said dielectric layer positioned at said external layer portion comprises, in an area of overlapping a pair of said first external conductor layers or a pair of said second external conductor layers adjacent to said dielectric layer, a plurality of pin hole conducting portions connecting a pair of said first external conductor layers or a pair of said second external conductor layers each other adjacent to said dielectric layer, in stacking direction.

Note that, in the present invention, "pluralities of the first external conductor layers and the second external conductor layers which are not overlapping in stacking direction" means that any of the first external conductor layer and any of the second external conductor layer are not overlapped. The first external conductor layers or the second external conductor layers may be overlapped.

According to the multilayer capacitor of the present invention, in an external layer portion, a first external conductor layer and a second external conductor layer are stacked via said dielectric layer which are not overlapping in stacking direction. Thus, in case that electric-potential of the first terminal electrode is higher than that of the second terminal electrode, from the first terminal electrode to the first external conductor layer, the electric current flows separately, and the electric current flows from the second external conductor layer into the second terminal electrode. On the other hand, in case that electric-potential of the second terminal electrode is higher than that of the first terminal electrode, from the second terminal electrode to the second external conductor layer, the electric current flows separately, and the electric current flows from the first external conductor layer into the first terminal electrode. As stated above, in any cases, by making the electric flow separately which flows from each terminal electrode to conductor layer, the ESL of whole multilayer capacitor can be reduced. Additionally, as a result of the fact that the external layer portion includes pluralities of first and second external conductor layers respectively, the effect of separately flowing the electric current from each terminal electrode to an external conductor layer can be increased. Namely, pluralities of the first external conductor layers and the second external conductor layers perform as a plurality of inductor components connected to each terminal electrode in parallel, so that the ESL of whole body of the multilayer capacitor can be reduced.

Also, a dielectric layer positioned at an external layer portion comprises a plurality of pin hole conducting portions which connect a pair of first external conductor portions or a pair of second external conductor portions each other adjacent to the dielectric layer respectively, in stacking direction. As a result, through the pin hole conducting portions, the electric current can be separated widely in stacking direction between a pair of the first external conductor layers or a pair of second external conductor layers. Further, it is possible to separate the electric current between the whole first external conductor layers or the whole second external conductor layers connected to each terminal electrode. As a result, the ESL of the whole body of the multilayer capacitor can be reduced further.

Also, in the present invention, by connecting the first or the second external conductor layers each other by an infinite number of pin hole conducting portions, the electric current can be more widely separated than that in the case of connecting a plurality of external conductor layer each other by through hole conducting portion penetrating in stacking direction, so that the ESL of the whole body of the multilayer capacitor can be reduced further.

That is, according to the multilayer capacitor of the present invention, a great reduction in the ESL of the multilayer capacitor is achieved, and fluctuation of the power source voltage can be suppressed, so that it can be suitably used as a decoupling capacitor, etc.

Preferably, a pin hole diameter of said pin hole conducting portion is 1 to 10 µm. Also preferably, said pin hole diameter of said pin hole conducting portion is larger than particle diameter of conductive materials filling into pin holes to form pin hole conducting portions. Note that a pin hole diameter means a diameter of pin hole conducting portions in a plane direction of a dielectric layer wherein the pin hole conducting portion is formed in the present invention.

By making a pin hole diameter is within a range of 1 to 10 µm, in forming process of the pin hole conducting portions, it is possible to fill conductive material into the pin hole, precisely. As a result, the pin hole conducting portions completely penetrate dielectric layer. Therefore., a pair of first external conductor layers or a pair of second external conductor layers adjacent to dielectric layer can be electrically connected each other, so that it is possible to spread the current sufficiently. As a result, the ESL of whole multilayer capacitor can be reduced.

Preferably, a total crossing area of said pin hole conducting portions is 30 to 50% with respect to a total area of said first external conductor layer and/or said second external conductor layer connected by the pin hole conducting portions. Note that, the total crossing area of pin hole conducting portions means total value of an area of a plurality of pin hole conducting portions (area in a plane direction vertical to stacking direction) formed on one dielectric layer.

By making a total crossing area of the pin hole conducting portion (current flow channel crossing area) is within the above range, the current is sufficiently separated between first external conductor layers or second external conductor layers, so that the ESL of whole multilayer capacitor can be reduced sufficiently. Also, strength of green sheet forming dielectric layer of external layer portion can be sufficient.

Preferably, a plurality of said pin hole conducting portions are randomly arranged in said stacking direction and a vertical plane direction to said stacking direction of said dielectric layer having said plurality of pin hole conducting portions.

By randomly arranging an infinite number of pin hole conducting portions in the external layer portion of the multilayer capacitor, it is possible to variously separate and to vary in direction of current between external conductor layers. This function and effect cannot be obtained by through hole conducting portion, etc. having larger size than that of pin hole conducting portion and limited number and being regularly arranged. Also, in the dielectric layer, by randomly arranging an infinite number of pin hole conducting portions, it is possible to increase adhesion strength of the dielectric layer with a first and a second external conductor layers adjacent to the dielectric layer.

Preferably, each of said first terminal electrode and said second terminal electrode are formed on at least any one of the first side face parallel to said stacking direction and the second side faces opposed to the first side face of said dielectric body.

Preferably, each of said first terminal electrodes and said second terminal electrodes are formed straddling said first side face or said second side face, and a fifth side face and/or a sixth side face vertical to said stacking direction and adjacent to the first side face and the second side face of said dielectric body.

Preferably, said first external conductor layer is connected with said first terminal electrode formed on said fifth side face and/or said sixth side face by a plurality of said pin hole conducting portions of said dielectric body placed between said first terminal electrode and said first external conductor layer; and said second external conductor layer is connected with said second terminal electrode formed on said fifth side face and/or said sixth side face by a plurality of said pin hole conducting portions of said dielectric body placed between said second terminal electrode and said second external conductor layer.

By connecting the first terminal electrode and the first external conductor layer by a plurality of pin hole conducting portions, the current can be separated between the first terminal electrode and the first external conductor layer. Similarly, due to connecting the second terminal electrode and the second external conductor layer by a plurality of pin hole conducting portions, the current can be separated between the second terminal electrode and the second external conductor layer. As a result, the ESL of whole multilayer capacitor can be reduced.

Preferably, in a plane direction vertical to said stacking direction, each of the first terminal electrode in said fifth side face and/or said sixth side face completely covers said first external conductor layer, which is adjacent to the first terminal electrode in said stacking direction, and connected to the first terminal electrode; and in a plane direction vertical to said stacking direction, each of the second terminal electrode in said fifth and/or said sixth side face completely covers said second external conductor layer, which is adjacent to the second terminal electrode in said stacking direction, and connected to the second external conductor layer.

In the present invention, pin hole conducting portions are formed only in a area of overlapping the first external conductor layer and/or the second external conductor layer in the dielectric layer positioned in an external layer portion. Therefore, in the plane direction vertical to stacking direction, each of the first terminal electrode in the fifth side face and/or the sixth side face is adjacent to the first terminal electrode in stacking direction and completely covers the first external conductor layer connected with the first terminal electrode, so that it is possible to prevent exposure of the pin hole conducting portions to the fifth side face and/or the sixth side face of the dielectric body. Similarly, in the plane direction vertical to stacking direction, each of the second terminal electrode in the fifth side face and/or the sixth side face is adjacent to the second terminal electrode in stacking direction and completely covers the second external conductor layer connected with the second terminal electrode, so that it is possible to prevent exposure of the pin hole conducting portions to the fifth side face and/or the sixth side face of the dielectric body.

As just described, by preventing exposure of the pin hole conducting portions to side faces of the dielectric body, it is possible to prevent deterioration (oxidization) of the pin hole conducting portions. Further, it is also possible to prevent contamination by impurities, such as moisture and conductive materials, from the pin hole conducting portions to the inside of the capacitor during the production process of the multilayer capacitor.

Preferably, each of said first terminal electrode completely covers said first internal conductor layer and said first external conductor layer exposed on said first side face or said second side face; and each of said second terminal electrode completely covers said second internal conductor layer and said second external conductor layer exposed on said first side face or said second side face.

As a result, it is possible to prevent exposing each of internal conductor layers and each of external conductor layers on the first side face and the second side face of the dielectric body, so that it is possible to prevent deterioration (oxidization) of each of the internal conductor layers and each of the external conductor layers.

The method for manufacturing multilayer capacitor according to the present invention comprises the steps of:
 forming an internal layer green sheet;
 forming said first internal conductor layer and said second internal conductor layer;
 forming an internal layer stacking portion by alternately stacking said first internal conductor layer and said second internal conductor layer via said internal layer green sheet as mutually overlapping in said stacking direction;
 forming an external layer green sheet having a plurality of pin holes;
 forming pluralities of said first external conductor layer and said second external conductor layer;
 forming a plurality of said pin hole conducting portions by filling a plurality of said pin holes with conductive material;
 forming an external layer stacking portion by stacking a plurality of said first external conductor layer and said second external conductor layer via said external layer green sheet in which said pin hole conducting portions are formed, without overlapping each other in said stacking direction;
 forming a multilayer body by stacking said external layer stacking portion on at least any one of both end faces vertical to said stacking direction in said internal layer stacking portion;
 forming a green chip by cutting predetermined dimension of multilayer body;
 forming said dielectric body by firing said green chip; and
 forming pluralities of said first terminal electrodes and said second terminal electrodes on said dielectric body.

Preferably, said pin hole conducting portions are formed simultaneously with forming said first external conductor layer or said second external conductor layer on a surface of said external layer green sheet by stacking. For example, in the case of forming the first external conductor layer or said second external conductor layer on an external layer green sheet surface by printing method, electrode paste (conductive material) for forming these conductor layers enters pin holes of the external layer green sheet, and the pin hole conducing portions are formed simultaneously. Namely, in the method for manufacturing multilayer capacitor according to the present invention, the first external conductor layer and the second external conductor layer can be formed simultaneously with forming the pin hole conducting portions.

Preferably, said internal layer portion is formed continuously after forming said external layer portion. Further preferably, said external layer portion is formed continuously after forming said internal layer portion. Although a process of multilaying green sheet can be conducted divisionally by respective blocks of an external multilayer portion or an internal multilayer portion, it is more preferable to continuously operate without dividing them.

Note that, in the present invention, the first internal conductor layer and the second internal conductor layer are relative concept and thus, the first internal conductor layer and the second internal conductor layer may be converse. Further, other "a first . . ." and "a second . . ." are similar to this. The first external conductor layer and the second external conductor layer are similar, too.

BRIEF DESCRIPTION OF DRAWINGS

Below, the present invention will be explained based on an embodiment shown in the figures.

DESCRIPTION OF THE PREFERRED EMBODIMENTS (Multilayer Capacitor)

Figure 1:
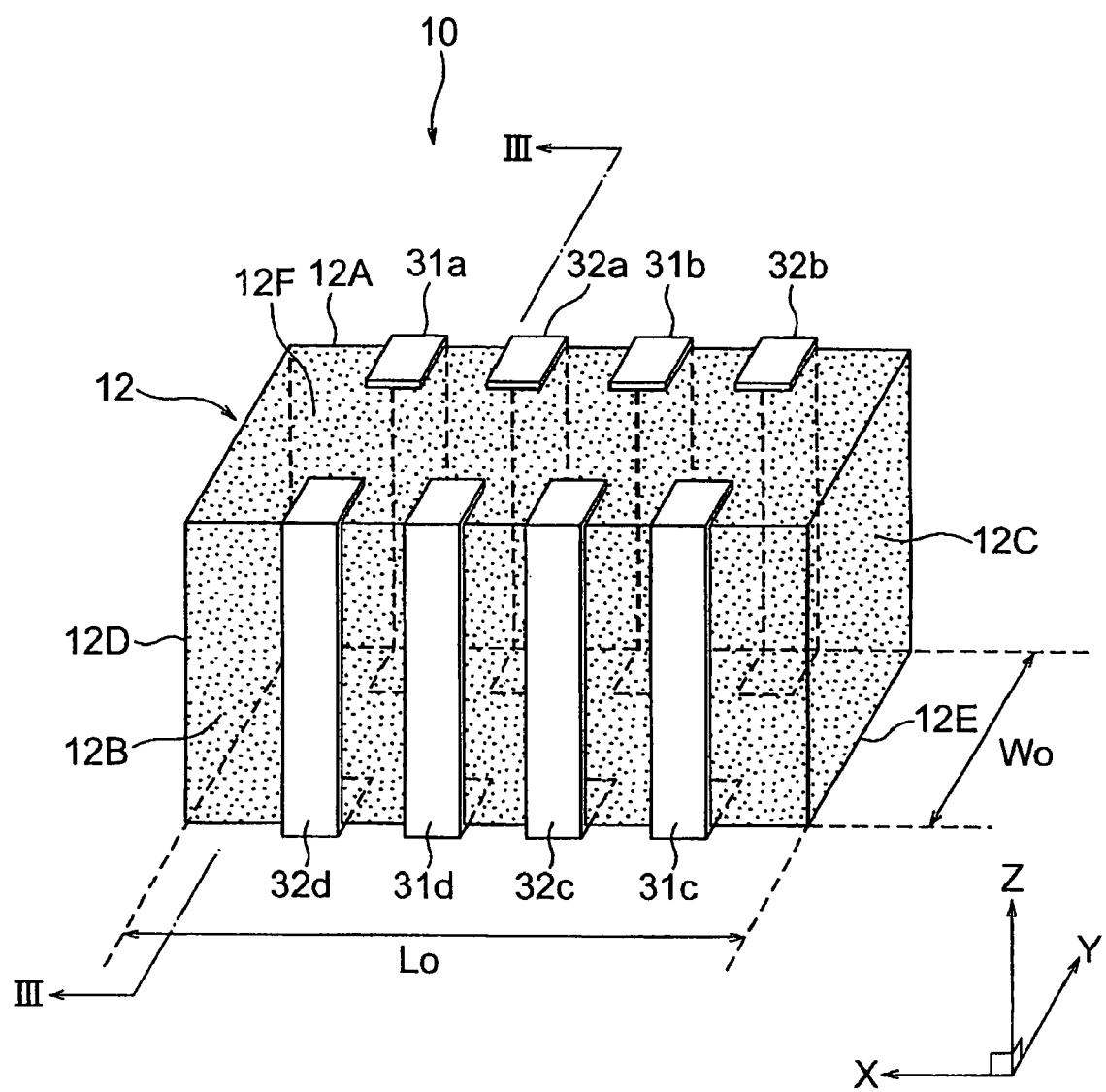
FIG. 1 is a perspective view of a multilayer capacitor in one embodiment of the present invention.

Whole constitution of a multilayer ceramic capacitor 10 of an embodiment of the present invention (hereinafter simply referred to as a multilayer capacitor) is specified. As shown in FIG. 1, the multilayer capacitor 10 comprises a dielectric body 12, a rectangular parallelepiped shaped sintered body obtained by firing a stack of a plurality of ceramic green sheets as dielectric layers.

The dielectric body 12 comprises a first side face 12A parallel to stacking direction Z of the dielectric layer and a second side face 12B opposed thereto. Also, the dielectric body 12 comprises a third side face 12C and a fourth side face 12D adjacent to the first side face 12A and the second side face 12B, parallel to stacking direction Z of the dielectric layer and opposed each other. Further, the dielectric body 12 comprises a fifth side face 12E and a sixth side face 12F adjacent to the first side face 12A and the second side face 12B, vertical to stacking direction Z and opposed each other.

On an external surface of the dielectric body 12, first terminal electrodes 31a and 31b and second terminal electrodes 32a and 32b are formed straddling three side faces of the first side face 12A, the fifth side face 12E and the sixth side face 12F. Further, the first terminal electrodes 31c and 31d and the second terminal electrodes 32c and 32d are formed straddling three side faces of the second side face 12B, the fifth side face 12E and the sixth side face 12F.

As shown in FIG. 1, each of the first terminal electrodes 31a to 31d and each of the second terminal electrodes 32a to 32d are electrically insulated each other. Also, respective electric potentials of the first terminal electrodes and the second terminal electrodes are set differently in an electronic circuit. Namely, when each of the first terminal electrodes is connected to positive electrode in the electronic circuit and has higher electric potential, each of the second terminal electrodes is connected to negative electrode and has lower electric potential against each of the first terminal electrodes. Note that high-low relation of electric potential of each of the first terminal electrodes and each of the second terminal electrodes in the electronic circuit may be converse.

Preferably, as shown in FIG. 1, the first terminal electrode 31a and 31b and the second terminal electrodes 32a and 32b are alternately arranged along X direction of the first side face 12A. Similarly, it is preferable that the first terminal electrodes 31c and 31d and the second terminal electrodes 32c and 32d are alternately arranged along X direction of the second side face 12B. Also, preferably, at a position opposed to each of the first electrodes formed on the first side face 12A (the second side face 12B), each of the second terminal electrodes is formed. Similarly, it is preferable that each of the first terminal electrodes is formed at a position opposed to each of the second electrodes formed on the first side face 12A (the second side face 12B).

As stated above, by arranging each of the first terminal electrodes and the second terminal electrodes so that electric polarities of respective terminal electrode adjacent to each other are conversed, magnetic fields occurred in the vicinity of the respective terminal electrodes are balanced out between adjacent terminal electrodes. As a result, the ESL of whole multilayer capacitor 10 can be reduced.

Figure 2:
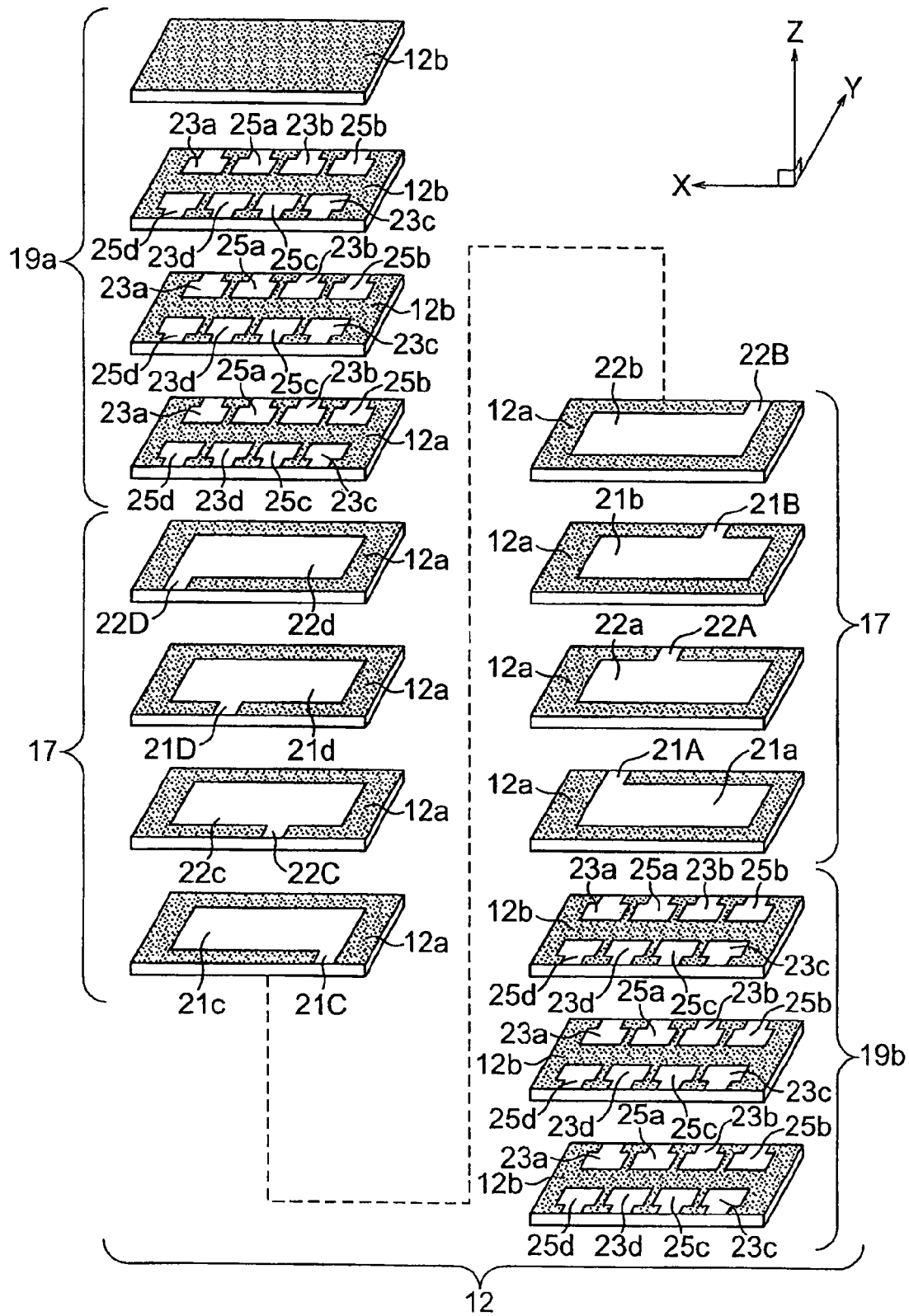
FIG. 2 is an exploded perspective view of the dielectric body of FIG. 1.

As shown in FIG. 2, the dielectric body 12 comprises an internal layer portion 17 and external layer portions 19a and 19b. The external layer portions 19a and 19b are positioned adjacent to both end faces of the internal layer portion 17 in stacking direction Z.

In the internal layer portion 17, pluralities of the first internal conductor layers 21a, 21b, 21c and 21d and the second internal conductor layers 22a, 22b, 22c and 22d are alternately stacked so as to overlap each other via dielectric layers 12a in stacking direction Z. An internal electrode circuit of capacitor is formed. In the present embodiment, in a manner sandwiching between the dielectric layers 12a, four sheets of the first internal conductor layers and four sheets of the second internal layers are alternately arranged in the dielectric body 12.

In the external layer portions 19a and 19b, each of the first external conductor layers 23a, 23b, 23c and 23d and the second external conductor layers 25a, 25b, 25c and 25d are stacked in stacking direction Z, via the dielectric layers 12b. Also, as shown in FIG. 2, each of the external conductor layers are stacked without overlapping respective conductor layers connected with the different terminal electrodes in stacking direction Z.

Each of the first terminal electrodes shown in FIG. 1 is connected to any one of the first internal conductor layers shown in FIG. 2 and a plurality of the respective first external conductor layers. Further, pluralities of the respective first external conductor layers are electrically connected by the pin hole conducting portions included in the dielectric layer 12b positioned between the respective first external conductor layers.

In the first terminal electrode 31a shown in FIG. 1, the first internal conductor layer 21a and six of the first external conductor layers 23a shown in FIG. 2 are connected. Also, each of three first external conductor layers 23a in the external layer portion 19a and each of three first external conductor layers 23a in the external layer portion 19b are connected each other by the pin hole conducting portions formed on the dielectric layer 12b.

In the first terminal electrode 31b shown in FIG. 1, the first internal conductor layer 21b and six of the first external conductor layers 23b shown in FIG. 2 are connected. Also, each of three first external conductor layers 23b in the external layer portion 19a and each of three first external conductor layers 23b in the external layer portion 19b are connected each other by the pin hole conducting portions formed on the dielectric layer 12b.

In the first terminal electrode 31c shown in FIG. 1, the first internal conductor layer 21c and six of the first external conductor layers 23c shown in FIG. 2 are connected. Also, each of three first external conductor layers 23c in the external layer portion 19a, and each of three first external conductor layers 23c in the external layer portion 19b are connected each other by the pin hole conducting portions formed on the dielectric layer 12b.

In the first terminal electrode 31d shown in FIG. 1, the first internal conductor layer 21d and six of the first external conductor layers 23d shown in FIG. 2 are connected. Also, each of three first external conductor layers 23d in the external layer portion 19a and each of three first external conductor layers 23d in the external layer portion 19b are connected each other by the pin hole conducting portions formed on the dielectric layer 12b.

Each of the second terminal electrodes shown in FIG. 1 are connected to any one of the second internal conductor layers shown in FIG. 2 and a plurality of the respective second external conductor layers as stated below. Further, pluralities of the respective second external conductor layers are electrically connected by the pin hole conducting portions included in the dielectric layer 12b positioned between the respective second external conductor layers.

In the second terminal electrode 32a shown in FIG. 1, the second internal conductor layer 22a and six of the second external conductor layers 25a shown in FIG. 2 are connected. Also, each of three second external conductor layers 25a in the external layer portion 19a and each of three second external conductor layers 25a in the external layer portion 19b are connected each other by the pin hole conducting portions formed on the dielectric layer 12b.

In the second terminal electrode 32b shown in FIG. 1, the second internal conductor layer 22b and six of the second external conductor layers 25b shown in FIG. 2 are connected.

Also, each of three second external conductor layers 25b in the external layer portion 19a, and each of three second external conductor layers 25b in the external layer portion 19b are connected each other by the pin hole conducting portions formed on the dielectric layer 12b.

In the second terminal electrode 32c shown in FIG. 1, the second internal conductor layer 22c and six of the second external conductor layers 25c shown in FIG. 2 are connected. Also, each of three second external conductor layers 25c in the external layer portion 19a and each of three second external conductor layers 25c in the external layer portion 19b are connected each other by the pin hole conducting portions formed on the dielectric layer 12b.

In the second terminal electrode 32d shown in FIG. 1, the second internal conductor layer 22d and six of the second external conductor layers 25d shown in FIG. 2 are connected. Also, each of three second external conductor layers 25d in the external layer portion 19a and each of three second external conductor layers 25d in the external layer portion 19b are connected each other by the pin hole conducting portions formed on the dielectric layer 12b.

Note that each of the first internal conductor layers and the first external conductor layers connected to each of the first terminal electrodes and each of the second internal conductor layers and the second external conductor layers connected to each of the second terminal electrodes have different electric potentials each other, as similar to each of the terminal electrodes, since electric potentials of each of the first terminal electrodes and each of the second terminal electrodes are differently set as stated above.

Preferably, each of the first terminal electrode of FIG. 1 completely covers the first internal conductor layer and the first external conductor layers exposed on the first side face 12A or the second side face 12B, and each of the second terminal electrode completely covers the second internal conductor layer and the second external conductor layer exposed on the first side face 12A or the second side face 12B.

As a result, it is possible to prevent exposing each of the internal conductor layers and each of the external conductor layers on the first side face 12A and the second side face 12B of the dielectric body 12, so that it is possible to deterioration (oxidization) of each of the internal conductor layers and each of the external conductor layers.

Next, in the following, the pin hole conducting portion 20 at the external layer portions 19a and 19b will be explained in detail by using FIG. 3 which is a cross sectional view vertical to X direction of a multi layer capacitor 10 showing the first terminal electrode 31a and the second terminal electrode 32d.

Figure 3:
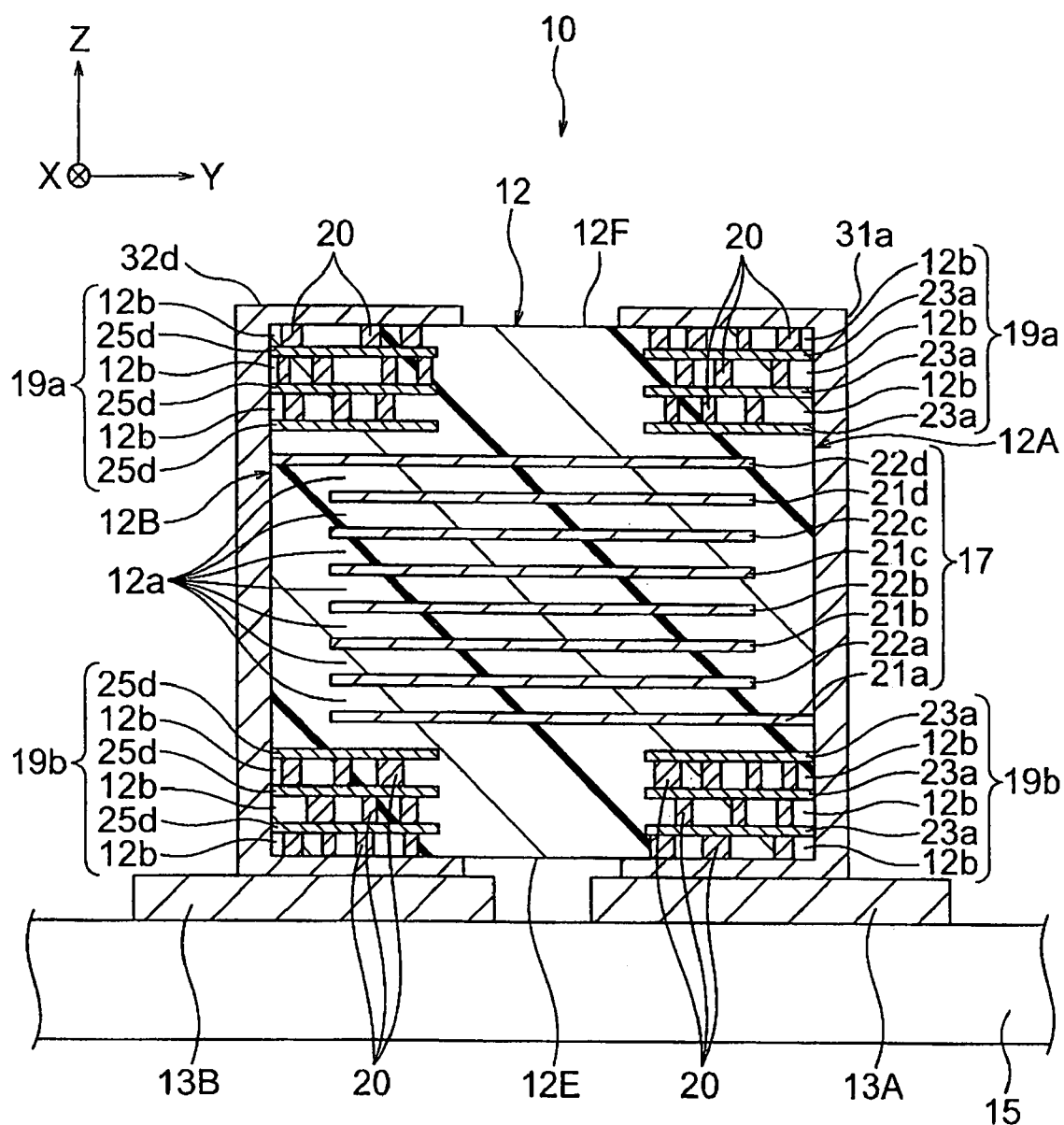
FIG. 3 is a schematic cross sectional view of the multilayer capacitor of FIG. 1 observed from III-III direction.

As shown in FIG. 3, in the external layer portions 19a and 19b, the dielectric layers 12b comprise a plurality of pin hole conducting portions 20 in an area of overlapping a pair of the first external conductor layers 23a and a pair of the second external conductor layers 25 adjacent to the dielectric layers 12b. The plurality of the pin hole conducting portions 20 electrically connect a pair of the first external conductor layer 23a each other or a pair of the second external conductor layer 25d each other adjacent to the dielectric layers 12b, in stacking direction Z.

Preferably, the first terminal electrode 31a formed on the fifth side face 12E and the sixth side face 12F and the first external conductor layer 23a are connected by a plurality of the pin hole conducting portions 20 included in the dielectric layer 12b positioned between the first terminal electrode 31a and the first external conductor layer 23a. Also preferably, the second terminal electrode 32d formed on the fifth side face 12E and the sixth side face 12F and the second external conductor layer 25d are connected by a plurality of the pin hole conducting portions 20 included in the dielectric layer 12b positioned between the second terminal electrode 32d and the second external conductor layer 25d.

By connecting the first terminal electrode 31a and the first external conductor layer 23a by a plurality of the pin hole conducting portions 20, the current can be separated between the first terminal electrode 31a and the first external conductor layer 23a. Similarly, by connecting the second terminal electrode 32d and the second external conductor layer 25d by a plurality of the pin hole conducting portions 20, the current can be separated between the second terminal electrode 32d and the second external conductor layer 25d. As a result of this, the ESL of whole multilayer capacitor 10 can be reduced.

As shown in FIG. 3, the first terminal electrode 31a and the second terminal electrode 32d of the multilayer capacitor 10 are connected on a circuit substrate 15 via substrate side electrode terminals 13A and 13B, respectively.

As above, the construction of the multilayer capacitor in the cross sectional view (FIG. 3) vertical to direction X of the multilayer capacitor 10 showing the first terminal electrode 31a and the second terminal electrode 32d has been explained. Note that the constructions of the multilayer capacitor in the cross sectional views, showing the first terminal electrode 31d and the second terminal electrode 32a, showing the first terminal electrode 31b and the second terminal electrode 32c and showing the first terminal electrode 31c and the second terminal electrode 32b, are same as above in FIG. 3, except for corresponding relations of the respective internal conductor layers and the respective external conductor layers with the respective terminal electrodes. Therefore, explanation for the other cross sectional views is omitted.

Figure 4:
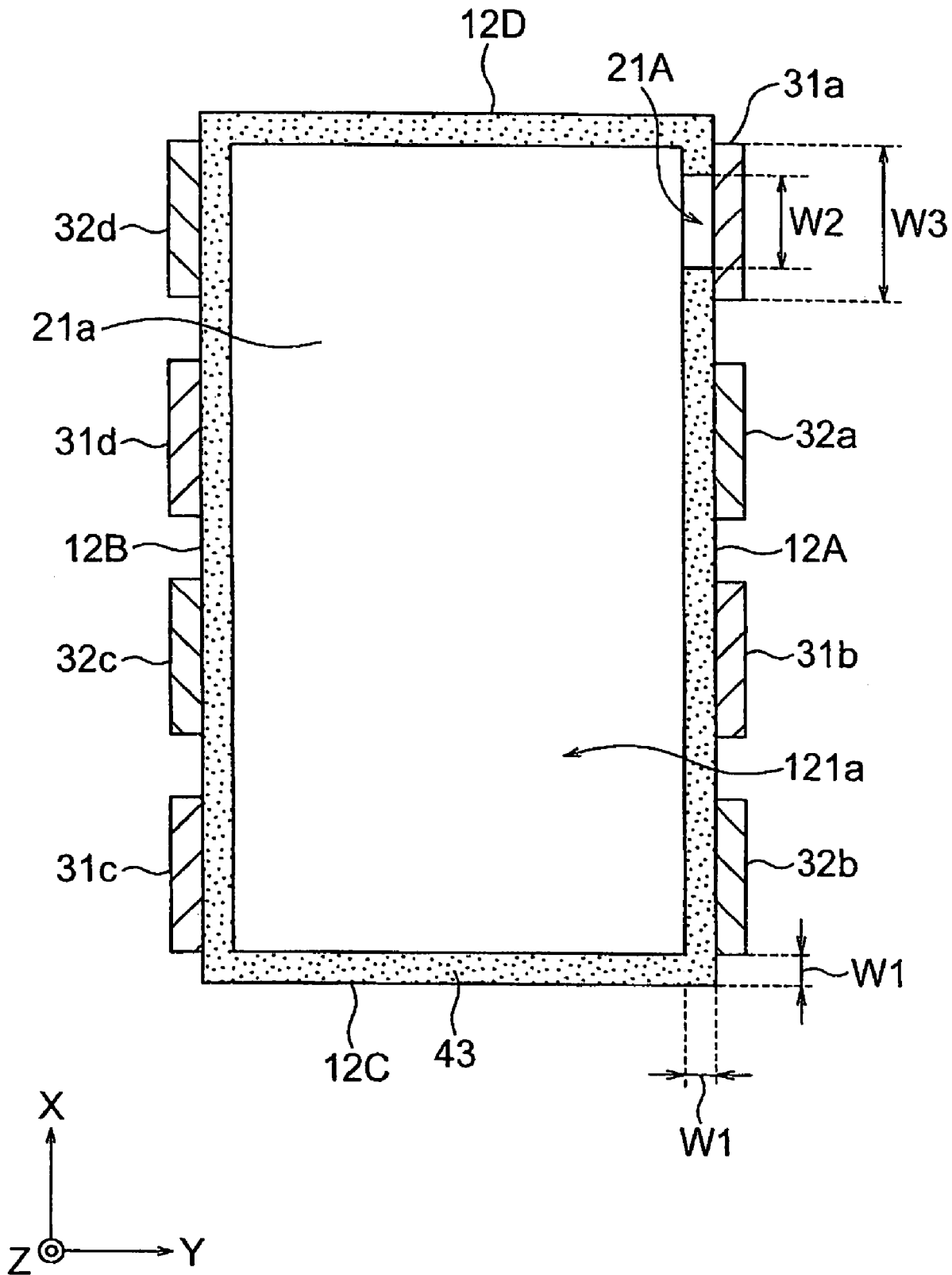
FIG. 4 is a plane view of a first internal conductor layer of a multilayer capacitor in one embodiment of the present invention.

FIG. 4 is a plane view wherein the first internal conductor layer 21a in the multilayer capacitor 10 is observed from stacking direction Z. The internal conductor layer 21a has a shape corresponding to the external shape of the dielectric layer 12a, and a main body portion 121a spaced with predetermined insulating space pattern 43 from circumference end portion of the dielectric layer 12a. The main body portion 121a of the internal conductor layer is a part of composing one of electrodes of the capacitor. The first internal conductor layer 21a is formed on the same plane with the main body portion 121a integrally, and further comprises a first lead portion 21A led out to the first side face 12A of the dielectric body 12. In the first lead portion 21A, the first internal conductor layer 21a and the first terminal electrode 31a are connected.

A space width W1 of the insulating space pattern 43 is preferably 100 to 200 μm or so. If the space width W1 is too small, the insulation properties with each of the first terminal electrodes 31a to 31d and each of the second terminal electrodes 32a to 32d are liable to be insufficient; when too large, an area of the main body portion 121a will be reduced and an ability as capacitor is liable to decline Preferably, a width W2 of the first lead portion 21A is smaller than a width W3 of the first terminal electrode 31a connected with the first lead portion 21A. Namely, it is preferable to be W2<W3. By making W2<W3, in the first side face 12A, the first lead portion 21A is completely covered by the first terminal electrode 31a. As a result, it is possible to prevent exposure and deterioration (oxidization) of the first lead portion 21A (and the main body portion 121a of the internal conductor layer).

Note that other first internal conductor layers comprise the first lead portions respectively and are connected with each of the first terminal electrodes via the first lead portion. The first internal conductor layer 21b (FIG. 2) is connected with the second terminal electrode 31b (FIG. 1) via the first lead portion 21B. The first internal conductor layer 21c (FIG. 2) is connected with the second terminal electrode 31c (FIG. 1) via the first lead portion 21C. The first internal conductor layer 21d (FIG. 2) is connected with the second terminal electrode 31d (FIG. 1) via the first lead portion 21D.

Also, other second internal conductor layers comprise the second lead portions respectively and are connected with each of the second terminal electrode via the second lead portion. The second internal conductor layer 22a (FIG. 2) is connected with the second terminal electrode 32a (FIG. 1) via the second lead portion 22A. The second internal conductor layer 22b (FIG. 2) is connected with the second terminal electrode 32b (FIG. 1) via the second lead portion 22B. The second internal conductor layer 22c (FIG. 2) is connected with the second terminal electrode 32c (FIG. 1) via the second lead portion 22C. The second internal conductor layer 22d (FIG. 2) is connected with the second terminal electrode 32d (FIG. 1) via the second lead portion 22D.

Note that plane views observed from direction Z of each of the first internal conductor layers 21b to 21d and each of the first lead portions 21B to 21D, and each of the second internal conductor layers 22a to 22d and the second lead portions 22A to 22D are similar to FIG. 4 other than connecting positions of each conductor layer and each terminal electrode. Therefore, explanation is omitted for these plane views.

Figure 5:
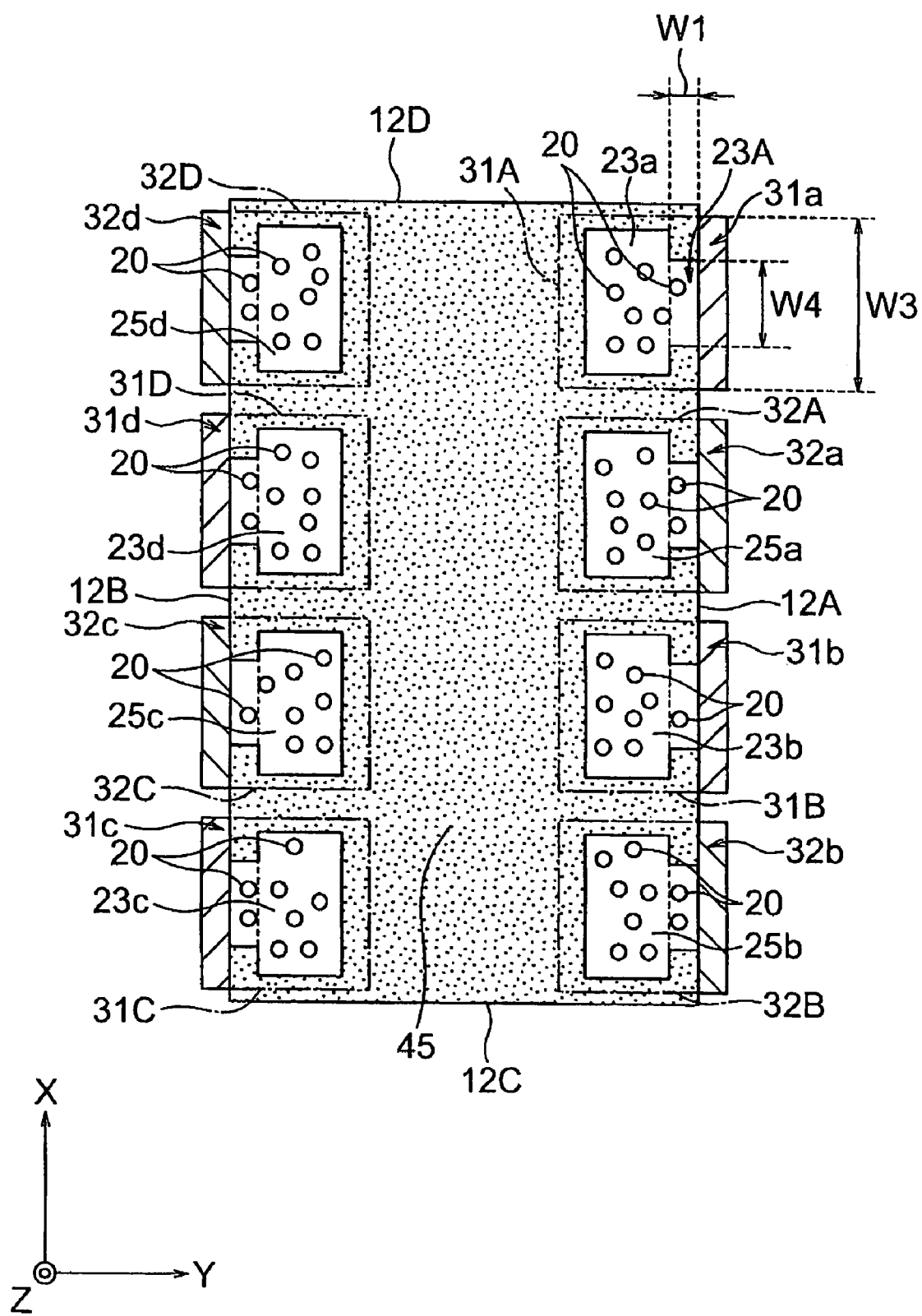
FIG. 5 is a plane view of first external conductor layers and second external conductor layers of a multilayer capacitor in one embodiment of the present invention.

FIG. 5 is a observed plane view of the first external conductor layers 23a to 23d and the second external conductor layers 25a to 25d positioned on an identical plane vertical to stacking direction Z in the external layer portion 19b of the multilayer capacitor 10 (FIGS. 2 and 3). As shown in FIG. 5, the first external conductor layers 23a to 23d and the second external conductor layers 25a to 25d are arranged via an insulating space pattern 45. Accordingly, respective external conductor layers arranged in the identical plane are not electrically conducted each other.

Note that the first external conductor layers 23a to 23d and the second external conductor layers 25a to 25d are not necessarily arranged on an identical plane as far as not overlapping each other in stacking direction Z.

The first external conductor layer 23a comprises a third lead portion 23A which is integrally formed with the first external conductor layer 23a on an identical plane and led out to the first side face 12A of the dielectric body 12. The first external conductor layer 23a is connected with the first terminal electrode 31a via the third lead portion 23A. Note that the other first external conductor layers and the second external conductor layers comprise third lead portions respectively, and are connected with each of the terminal electrodes via the respective third lead portions. The shape, dimension and connecting relation for the respective external conductor layers, the third lead portions and the terminal electrodes are all similar. Therefore, in the following, only the first external conductor layer 23a, the third lead portion 23A and the first terminal electrode 31a will be explained.

Preferably, a width W4 of the third lead portion 23A in direction X is smaller than a width W3 of the first terminal electrode 31a connected with the third lead portion 23A. Namely, being W4<W3 is preferable. By making W4<W3, in the first side face 12A, the third lead portion 23A is completely covered by the first terminal electrode 31a. As a result, it is possible to prevent exposure and deterioration (oxidization) of the third lead portion 23A (and the first external conductor layer 23a). Note that, a width of the third lead portion 23A (a space width W1 of the insulating space pattern 45) in direction Y is 100 to 200 µm or so.

A plurality of pin hole conducing portions 20 are connected to the first external conductor layers 23a to 23d and the second external conductor layers 25a to 25d in an area where each of the conductor layers is overlapped with dielectric layer 12b adjacent to each of the conductor layers.

Preferably, a pin hole diameter of the pin hole conducting portion 20 is 1 to 10 µm. Also preferably, the pin hole diameter of the pin hole conducting portions 20 is larger than a particle diameter of conductive material (metallic particle) filled in the pin hole in order to make the pin hole conducting portion 20.

By making pin hole diameter within a range of 1 to 10 µm, in forming process of the pin hole conducting portions 20, it is possible to fill conductive material into the pin hole, precisely. As a result, the pin hole conducting portions 20 completely penetrate the dielectric layer 12b. Therefore, a pair of the respective external conductor layers adjacent to the dielectric layer 12b can be connected electrically each other, so that it is possible to separate the current sufficiently. As a result, the ESL of whole multilayer capacitor 10 can be reduced.

Preferably, a total crossing area of the pin hole conducting portions 20 is 30 to 50% to an area of the first external conductor layers 23a to 23d and the second external conductor layers 25a to 25d connected by the pin hole conducting portions 20. Note that the total crossing area of the pin hole conducting portions 20 means total value of an area of a plurality of pin hole conducting portions 20 (area of XY-plane direction vertical to stacking direction Z) formed on one dielectric layer 12b.

By making the total crossing area of the pin hole conducting portions 20 (current flow channel crossing area) within the above range, the current is sufficiently separated between the first external conductor layers or the second external conductor layers overlapping in stacking direction Z, and thus, the ESL of whole multilayer capacitor 10 can be reduced sufficiently. Also, strength of an external layer green sheet forming the dielectric layer 12b of the external layer portion 19b can be sufficient.

Preferably, a plurality of pin hole conducting portions 20 are randomly arranged in stacking direction Z and an XY plane direction vertical to stacking direction Z of the dielectric layer 12b having a plurality of the pin hole conducting portions 20.

By randomly arranging an infinite number of the pin hole conducting portions 20 in stacking direction Z and the XY plane direction, it is possible to variously separate and to vary in direction of current between the first external conductor layers and the second external conductor layers. This function and effect cannot be obtained by through hole conducting portion, etc. having larger size than that of pin hole conducting portion and limited number of through holes (hole diameter is about 50 µm). Also, by randomly arranging an infinite number of the pin hole conducting portions 20 in the dielectric layer 12b, it is possible to increase adhesion strength of the dielectric layer 12b with the first external conductor layer or the second external conductor layer adjacent to the dielectric layer 12b.

Preferably, as shown in FIG. 5, in the XY plane direction vertical to stacking direction Z, each of the first terminal electrode 31A to 31D in the fifth side face 12E completely covers each of the first external conductor layers 23a to 23d, adjacent to each of the first terminal electrode 31A to 31D and connected with each of the first terminal electrode 31A to 31D in stacking direction Z. Also, similarly, in the XY plane direction vertical to stacking direction Z, each of the first terminal electrode 31A to 31D in the sixth side face 12F completely covers each of the first external conductor layers 23a to 23d, adjacent to each of the first terminal electrode 31A to 31D and connected with each of the first terminal electrode 31A to 31D.

Preferably, as shown in FIG. 5, in the XY plane direction vertical to stacking direction Z, each of the second terminal electrode 32A to 32D in the fifth side face 12E completely covers each of the second external conductor layers 25a to 25d, adjacent to each of the second terminal electrode 32A to 32D and connected with each of the second terminal electrode 32A to 32D in stacking direction Z. Also, similarly, in the XY plane direction vertical to stacking direction Z, each of the second terminal electrode 32A to 32D in the sixth side face 12F completely covers each of the second external conductor layers 25a to 25d, adjacent to each of the second terminal electrode 32A to 32D and connected with each of the second terminal electrode 32A to 32D.

In the present embodiment, the pin hole conducting portions 20 are formed only in an area of overlapping the first external conductor layers 23a to 23d and/or the second external conductor layers 25a to 25d in the dielectric layer 12b positioned in external layer portions 19a and 19b. Therefore, in the XY plane direction vertical to stacking direction Z, as a result of the fact that each of the first terminal electrodes 31A to 31D in the fifth side face 12E and the sixth side face 12F completely covers the first external conductor layers 23a to 23d which are adjacent to each of the first terminal electrodes 31A to 31D and connected with each of the first terminal electrodes 31A to 31D in stacking direction Z, it is possible to prevent exposure of the pin hole conducting portions 20 to the fifth side face 12E and the sixth side face 12F of the dielectric body 12. Similarly, in the XY plane direction vertical to stacking direction Z, as a result of the fact that each of the second terminal electrodes 32A to 32D in the fifth side face 12E and the sixth side face 12F completely covers the second external conductor layers 25a to 25d which are adjacent to each of the second terminal electrodes 32A to 32D and connected with each of the second terminal electrodes 32A to 32D in stacking direction Z, it is possible to prevent exposure of the pin hole conducting portions 20 to the fifth side face 12E and the sixth side face 12F of the dielectric body 12.

As just described, by preventing exposure of the pin hole conducting portions 20 to side faces of the dielectric body 12, it is possible to prevent deterioration (oxidization) of the pin hole conducting portions 20. Further, it is also possible to prevent contamination by impurities such as moisture and conductive materials during the production process of the multilayer capacitor 10.

In the present embodiment, as shown in FIG. 2, the first external conductor layers 23a to 23d and the second external conductor layers 25a to 25d are stacked via dielectric layer 12b, respectively in an external layer portion 19b. Also, each of the external conductor layers is stacked so that the first external conductor layers and the second external conductor layers respectively connected to different terminal electrodes do not overlap each other in stacking direction Z. Further, the first external conductor layers 23a to 23d and the second external conductor layers 25a to 25d are not electrically connected. Accordingly, the first external conductor layers 23a to 23d and the second external conductor layers 25a to 25d perform as a dummy electrode having no function of internal electrode (storage function) in a capacitor. Namely, as a result of separating the electric current from the respective terminal electrodes to the respective dummy electrodes (the respective external conductor layers) connected to the respective terminal electrodes, the ESL of whole multilayer capacitor 10 can be reduced in the multilayer capacitor 10.

In the present embodiment, as a result of the fact that the external layer portion 19b includes pluralities of the first external conductor layers 23a to 23d and the second external conductor layers 25a to 25d respectively, the effect of separately flowing the electric current from each terminal electrode to an external conductor layer can be increased. Namely, pluralities of the first external conductor layers and the second external conductor layers perform as a plurality of inductor components connected in parallel to the respective terminal electrodes, so that the ESL of whole body of the multilayer capacitor can be reduced.

In the present embodiment, as shown in FIG. 3, the dielectric layer 12b positioned at the external layer portion 19b comprises a plurality of pin hole conducting portions 20 which electrically connect a pair of the first external conductor layers or a pair of the second external conductor layers each other adjacent to the dielectric layer 12b in stacking direction Z. As a result, through the pin hole conducting portions 20, the electric current can be separated widely in stacking direction Z between a pair of the first external conductor layers or a pair of the second external conductor layers. Further, in the external layer portion 19b, it is possible to separate the electric current between a plurality of the first external conductor layers (in FIG. 2, between three layers of the first external conductor layers 23a to 23d) or the second external conductor layers (in FIG. 2, between three layers of the second external conductor layers 25a to 25d) connected to the respective terminal electrodes and overlapping in stacking direction Z. As a result, the ESL of the whole body of the multilayer capacitor can be reduced further.

In the present embodiment, by arranging a plurality (8 layers) of internal conductor layers respectively in the dielectric body, not only does the electrostatic capacitance rise, but also the action canceling out the magnetic field becomes a greater, so that the inductance is more greatly reduced and the ESL is further reduced.

Thus, according to the multilayer capacitor 10 of the present embodiment, a great reduction in the ESL of the multilayer capacitor 10 is achieved, fluctuation of the power source voltage can be suppressed, and the capacitor can be suitably used as a decoupling capacitor, etc.

Note that the current does not flow in the external layer portion 19a, positioned at an opposite side of the circuit substrate 15 across the internal layer portion 17, of the two external layer portions 19a and 19b shown in FIG. 3. Consequently, the external layer portion 19a is not indispensable since it does not contribute the reduction of the ESL.

(Manufacturing Method of Multilayer Capacitor)

Next, a manufacturing method of the multilayer capacitor 10 according to the present embodiment will be explained. Note that manufacturing methods for the multilayer capacitor 10 according to the present embodiment are not limited to the following method.

Forming Internal Layer Green Sheet

Firstly, slurry for green sheet is applied to a surface of supporting sheet to form an internal layer green sheet. The internal layer green sheet will be the dielectric layer 12a in the internal layer portion 17 in the multilayer capacitor 10 (FIG. 3), after completed.

Forming method of internal layer green sheet is not particularly limited if layers are uniformly formed. A doctor blade method, a nozzle coating method, etc. are exemplified. Note that a formed green sheet is dried, if necessary.

Slurry for green sheet includes, as main components, ceramic powder such as calcium titanate, strontium titanate, and barium titanate. Further, as subcomponents, alkaline earth metal, transitional metal, rare-earth element, glass composition, etc. are included in the green sheet slurry. These ceramic powder and the subcomponents are mixed with solvent, dispersant, plasticizer, binder, etc. Then, dispersed processing is performed to obtain slurry for internal layer green sheet.

A solvent is not particularly limited, and glycols, alcohol, ketones, esters, aromatic series, etc. are exemplified. Specifically, terpineol, alcohol, butyl carbitol, acetone, methyl ethyl ketone (MEK), toluene, xylene, acetic ether, butyl stearate, isobornyl acetate, etc. are used.

A dispersant is not particularly limited, and maleic acid based dispersant, polyethylene glycol based dispersant, allyl ether copolymer dispersant are exemplified.

A plasticizer is not particularly limited, and phthalic acid ester, adipic acid, phosphoric ester, glycols, etc. are exemplified.

A binder is not particularly limited, and acrylic resin, butyral based resin such as polyvinyl butyral, polyvinyl acetal, polyvinyl alcohol, polyolefine, polyurethane, polystyrene, or organic compounds or emulsion composed of copolymer thereof are exemplified.

A supporting sheet material is not particularly limited as far as it has an appropriate flexibility at peeling and rigidity of the support medium. Normally, polyester film, etc. such as polyethylene terephthalate (PET) is used.

Forming External Layer Green Sheet and Pin Hole

Next, slurry for green sheet is applied to a surface of supporting sheet to form an external layer green sheet. The external layer green sheet will be the dielectric layer 12b in the external layer portions 19a and 19b in the multilayer capacitor 10, after completed.

Types of raw materials for forming the external layer green sheets are substantially the same as in the case of the above described internal layer green sheet. Therefore, in the following, only differences in forming methods for the external layer green sheet and the internal layer green sheet will be explained, and explanation of common points thereof are omitted.

In the external layer green sheet, pin holes are formed in order to form the pin hole conducting portions 20 in a post-process.

A forming method for the pin hole is not particularly limited, and there may be mentioned the following methods.

For example, as a main component of the slurry for green sheet, ceramic powders having rougher shape and larger particle diameter (calcium titanate, strontium titanate, barium titanate, etc.) are used than those for the internal green sheet. As a result, micro-spaces, i.e., pin holes, are formed between the ceramic powders included in the green sheet.

Alternatively, by adjusting compositions and contents of binder, solvent, etc. included in the green sheet slurry, it is possible to form defect (holes) intentionally in the green sheet. The defect acts as pin holes.

Alternatively, the thickness of the external layer green sheet can be thinner than that of the internal layer green sheet. By making the external layer thinner, the defect is formed intentionally on the green sheet. The defect acts as pinholes.

Preferably, a pin hole diameter formed on the external layer green sheet is 1 to 10 µm. Also preferably, the pin hole diameter is larger than particle diameter of conductive materials (metallic particle) filled into the pin holes in order to form pin hole conducting portions.

In the present embodiment, by making the pin hole diameter within a range of 1 to 10 µm, the above problems are prevented and the ESL of whole multilayer capacitor 10 can be reduced.

Forming Internal Dielectric Layer

Next, internal layer electrode paste is applied in a predetermined pattern on the surface of the internal layer green sheet to form the first internal conductor layers 21a to 21d (FIG. 2) before firing and the second internal conductor layers 22a to 22d (FIG. 2) before firing.

Forming method for each internal conductor layer is not particularly limited as far as it is a method capable to form the layer uniformly. For example, a thick film forming method using the internal layer electrode paste such as a screen printing method or gravure printing method, or a thin film forming method such as vapor deposition and sputtering are exemplified. Note that the internal conductor layer after forming is dried if necessary.

The internal layer electrode paste can be obtained by kneading conductive material, solvent, dispersant, plasticiser, binder, additive powder, etc. using a ball mill, etc. to slurry.

A conductive material is not particularly limited, and normally, Cu, Cu alloy, Ni, Ni alloy, Ag, Ag—Pd alloy, In—Ga alloy, etc. are used.

A solvent is not particularly limited, and terpineol, butylcarbitol, kerosene, acetone, isobornyl acetate, etc. are exemplified.

A dispersant is not particularly limited, and maleic acid based dispersant, polyethylene glycol based dispersant and allyl ether copolymer dispersant are exemplified.

A plasticiser is not particularly limited, and phthalic acid ester, adipic acid, phosphoric ester, glycols, etc. are exemplified.

A binder is not particularly limited, and acrylic resin, polyvinyl butyral resin, polyvinyl acetal resin, ethyl cellulose resin, etc. are exemplified.

As additive powder, co-material having same composition of ceramic powder included in the green sheet can be used. The co-material inhibits the sintering of the conductive material during firing process.

Forming External Conductor Layer and Pin Hole Conducting Portion

Next, external layer electrode paste is applied in a predetermined pattern on the surface of the external layer green sheet to form the first external conductor layers 23a to 23d (FIGS. 2 and 5) and the second external conductor layers 25a to 25d (FIGS. 2 and 5). In the following, differences informing methods for the external conductor layer and the internal conductor layer will be only explained, and explanation of common points are omitted.

Forming method for each external conductor layer is not particularly limited as far as it is a method capable to form layers uniformly. Preferably, a screen printing method or gravure printing method using external electrode paste is used.

By applying the external layer electrode paste including conductive material to the external layer green sheet having pin holes by printing, the first external conductor layer 23 and the second external conductor layer 25 are formed on the external green sheet. Simultaneously, the pin holes are filled by the external layer electrode paste (conductive material), so that the pin hole conducting portions 20 are formed. Namely, in the manufacturing method according to the present embodiment, forming the first external conductor layer 23 and the second external conductor layer 25, and forming the pin hole conducting portions 20 can be conducted simultaneously.

Preferably, a particle diameter of the conductive material (metallic particle) included in the external layer electrode paste is smaller than a pin hole diameter. By making the particle diameter of the conductive material smaller than the pin hole diameter, the pin holes are closely filled to form the pin hole conducting portions 20 which completely penetrate the external layer green sheet (later dielectric layer 12b).

Note that each external conductor layer is dried after forming if necessary.

Forming Blank Pattern Layer

Note that, after (or before) forming each conductor layer on the surface of each green sheet, blank pattern layer paste is applied to blank portions on the surface of each green sheet where each conductor layer is not formed, so that a blank pattern layer, having a same thickness as each conductor layer, is formed. As a result, gaps between each conductor layer and each green sheet can be cleared.

The blank pattern layers can be formed by similar method for each conductor layer or each green sheet. Note that the blank pattern layers are dried after forming if necessary.

As a blank pattern layer paste, normally, a paste similar to the green sheet paste is used.

Forming Stacking Layer Body

Next, the support sheet is peeled from the external layer green sheet, wherein the first external conductor layers 23a to 23d and the second external conductor layers 25a to 25d are formed, and stacked sequentially. As a result, an external layer stacking portion of lower side can be obtained. The external layer stacking portion of lower side becomes the external layer portion 19b in the multilayer capacitor 10 (FIGS. 2 and 3) after completed.

Next, on the external layer stacking portion of lower side, each of the internal layer green sheets, wherein the first internal conductor layers 21a to 21d and the second internal conductor layers 22a to 22d are formed respectively, are stacked sequentially. As a result, an internal layer stacking portion can be obtained. The internal layer stacking portion becomes the internal layer portion 17 in the multilayer capacitor 10 (FIG. 2, 3) after completed.

Next, on the internal layer stacking portion, external layer green sheets, wherein the first external conductor layers 23a to 23d and the second external conductor layers 25a to 25d are formed, are stacked sequentially. As a result, an external layer stacking portion of upper side can be obtained. The external layer staking portion of upper side becomes the external layer portion 19a in the multilayer capacitor 10 (FIGS. 2 and 3) after completed.

In the present embodiment, as stated above, preferably, the internal layer stacking portion is formed continuously after forming the external layer stacking portion. More preferably, another external layer stacking portion is formed after forming the internal layer stacking portion. Namely, the stacking process of the green sheets to form multilayer body may be performed by stacking each block of the external layer stacking portion and the internal layer stacking portion separately, but it is preferable to continuously perform these without distinction.

Next, the formed multilayer body is subject to heating and applying pressure (applying pressure to stacking direction Z).

Forming Green Chip

Next, a green chip is formed by cutting the multilayer body in a predetermined dimension. Then, the obtained green chip is polished by water barrel, etc. to make corner portions of the green chip round (R) after hardening and drying. The green chip after polishing is washed and dried.

Forming Dielectric Body

Next, a dielectric body 12 (FIGS. 1 and 2) is formed by performing binder removal processing, firing processing and annealing processing to the green chip.

Next, the obtained dielectric body 12 is subject to polishing process. By the polishing process, in the first side face 12A of the dielectric body 12, end portions of the first internal conductor layers 21a and 21b, the second internal conductor layers 22a and 22b, the first external conductor layers 23a and 23b and the second external conductor layers 25a and 25b, oxidized by firing and heat processing, are removed to expose unoxidized metal portions on each side face. Similarly, by polishing process, in the second side face 12B of the dielectric body 12, end portions of the first internal conductor layers 21c and 21d, the second internal conductor layers 22c and 22d, the first external conductor layers 23c and 23d, and the second external conductor layers 25c and 25d, oxidized by firing and heat processing, are removed to expose unoxidized metal portions on each side face.

The dielectric body 12 after polishing is washed and dried.

Forming Terminal Electrode

Next, as shown in FIG. 1, the first terminal electrodes 31a and 31b, and the second terminal electrodes 32a and 32b are formed on the first side face 12A of the dielectric body 12, respectively. Also, the first terminal electrodes 31c and 31d, the second terminal electrodes 32c and 32d are formed on the second side face 12B of the dielectric body 12, respectively.

Normally, each of the terminal electrodes is composed of three layers: foundation layer, intermediate plating layer and external plating layer.

Firstly, the foundation layer is formed on the dielectric body 12. The foundation layer is formed by applying electrode paste film (Ag, Cu, etc.) on each side face of the dielectric body 12 and performing firing process thereto.

Next, the intermediate plating layer is formed on a surface of the foundation layer formed on the dielectric layer 12. The intermediate plating layer is composed of Ni or Ni alloy films, etc., and is formed by electroless plating method.

Next, the external plating layer is formed on a surface of the intermediate plating layer to obtain the multilayer capacitor 10 shown in FIG. 1. Note that the external plating layer is formed by electrolytic plating method, etc. and is composed of plating layer of Sn or Sn alloy film.

In the manufacturing method according to the present embodiment, as mentioned above, by applying and printing the external layer electrode paste to the external layer green sheet having pin holes, each of the first external conductor layers and the second external conductor layers are formed, and simultaneously, the pin hole conducing portions 20 are formed as a result of filling the pin holes with the conductive paste. Namely, in the present embodiment, forming each of the first external conductor layers and the second external conductor layers and forming the pin hole conducting portions 20 can be performed simultaneously.

Note that the present invention is not limited to the above embodiments and may be variously modified within the scope of the present invention.

For example, in the multilayer capacitor of the present invention, the number of stacking layers is not particularly limited, and can be tens or hundreds.

In the above described present embodiment, as shown in FIG. 3, a dielectric body 12 comprises two external layer portions 19a and 19b. The current does not flow in the external layer portion 19a of the two external layer portions, positioned at an opposite side of the circuit substrate 15 across the internal layer portion 17. Consequently, the external layer portion 19a is not indispensable since it does not contribute the reduction of the ESL. However, as a result of the fact that the dielectric layer body 12 comprises the external layer portion 19a, the external layer portion 19a and the external layer portion 19b are symmetrically positioned across the internal layer portion 17. Namely, the dielectric body 12 may have a balanced shape. As a result, it is possible to prevent deformation of the dielectric body 12 when firing the dielectric body 12. Further, as a result of the fact that the dielectric body 12 comprises the external layer portion 19a, the multilayer capacitor 10 is capable to function even when the multilayer capacitor 10 of FIG. 3 is turned upside down with respect to the circuit substrate 15.

Also, more than two kinds of the first internal conductor layers 21a to 21d may be connected to the respective first terminal electrodes 31a to 31d. In other words, the respective first internal conductor layers 21a to 21d may be connected to more than two kinds of the first terminal electrodes 31a to 31d. Similarly, more than two kinds of the second internal conductor layers 22a to 22d may be also connected to the respective second terminal electrodes 32a to 32d. In other words, the respective second internal conductor layers 22a to 22d may be connected to more than two kinds of second terminal electrodes 32a to 32d. In this case, actions and effects similar to the above embodiment can be obtained.

In the above mentioned embodiment, the capacitor 10 comprises pluralities and same number of the first internal conductor layers and the second internal conductor layers, but the number of the first internal conductor layers and the second internal conductor layers may be different. Alternatively, any one of the conductor layers may be singular while other conductor layer may be plural. In this case, actions and effects similar to the above embodiment can be obtained.

In the above embodiment, the first terminal electrodes 31a to 31d and the second terminal electrodes 32a to 32d are formed on any one side face of the first side face 12A and the second side face 12B parallel to stacking direction Z in the dielectric body 12, but the first terminal electrode or the second terminal electrode may be formed on the third side face 12C or the fourth side face 12D parallel to stacking direction Z and adjacent to the first side face 12A and the second side face 12B. In this case, actions and effects similar to the above embodiment can be obtained.

EXAMPLE

Next, the present invention will be further explained based on specific example, but the present invention is not limited to this example. In the present example, the ESL of the respective capacitor samples has been found by converting from S parameter to impedance by using impedance analyzer.

Firstly, each capacitor sample is explained. A multi-terminal type multilayer capacitor according to the embodiment as shown in FIG. 1 is a sample Ex1. Further, a capacitor formed in the same way as in the sample Ex1 other than not comprising pin hole conducting portions 20 is a sample Cex1. The ESL of each sample was measured.

Figure 6:
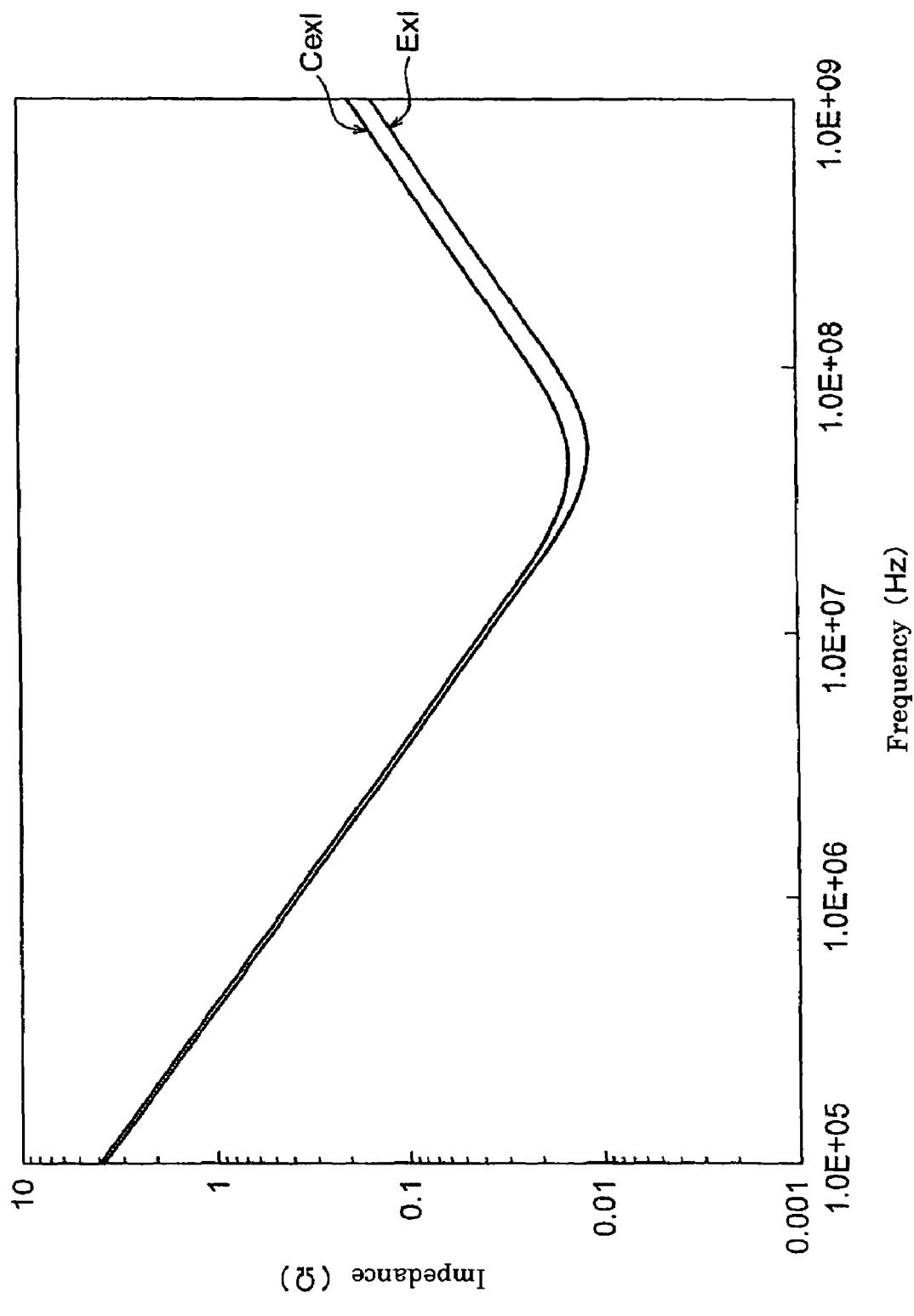
FIG. 6 is a graph of impedance characteristics of an example and a comparative example of the present invention.

As a result of this, impedance property of each sample was measured. The results are shown in FIG. 6. As shown in a chart of FIG. 6, at a high frequency side, it was confirmed that a value of impedance of the sample Ex1 becomes smaller than that of the sample Cex1. Further, when measuring the ESL, the sample Ex1 shows 27 pH, and the sample Cex1 shows 35 pH. Namely, it was confirmed that the ESL is greatly reduced in the sample Ex1 according to the present embodiment of the present invention.

Note that the ESL is obtained from the following equation:

$$2\pi f_o = 1/\sqrt{(ESL \cdot C)}$$

where $f_o$ is the self resonant frequency; and C is the electrostatic capacity.

As the dimensions of the samples used here, in FIGS. 1, 4 and 5, L0=1.6 mm, W0 is 0.8 mm, W1 is 0.15 mm, W2 is 0.12 mm, W3 is 0.25 mm and W4 is 0.12 mm. In case that total of 8 layers, the first internal conductor layers 21a, 21b, 21c and 21d and the second internal conductor layers 22a, 22b, 22c and 22d shown in FIG. 2, is one stacking unit, the total stacking number of the internal conductor layer is 70 stacking units, and the electrostatic capacity was 0.4 µF.

The invention claimed is:

1. A multilayer capacitor comprising:
a dielectric body formed by stacking a plurality of dielectric layers having an approximately rectangular parallelepiped shape;
an internal layer portion in which pluralities of first internal conductor layers and second internal conductor layers to be set at different electric potentials each other are stacked alternately in said dielectric body via said dielectric layer as mutually overlapping in stacking direction to form an internal electrode circuit of a capacitor;
an external layer portion in which pluralities of first external conductor layers and second external conductor layers to be set at different electric potentials which are not overlapping in stacking direction, are stacked in said dielectric body via said dielectric layer, the external layer portions being adjacent to at least any of both end faces of said internal layer portion in stacking direction; and
a first and a second terminal electrodes to be set at different electric potentials each other, formed at least on a side face parallel to stacking direction of said dielectric body; wherein
each of the first terminal electrodes is connected with at least one of said first internal conductor layers and a plurality of said first external conductor layers;
each of the second terminal electrodes is connected with at least one of said second internal conductor layers and a plurality of said second external conductor layers;
said dielectric layer positioned at said external layer portion comprises, in an area of overlapping a pair of said first external conductor layers or a pair of said second external conductor layers adjacent to said dielectric layer, a plurality of pin hole conducting portions connecting a pair of said first external conductor layers or a pair of said second external conductor layers each other adjacent to said dielectric layer, in stacking direction.

2. The multilayer capacitor as set forth in claim 1, wherein a pin hole diameter of said pin hole conducting portion is 1 to 10 µm, and a total crossing area of said pin hole conducting portions is 30 to 50% with respect to an area of said first external conductor layer and/or said second external conductor layer connected by the pin hole conducting portions.

3. The multilayer capacitor as set forth in claim 1, wherein a plurality of said pin hole conducting portions are randomly arranged in said stacking direction and a vertical plane direction to said stacking direction of said dielectric layer having said plurality of pin hole conducting portions.

4. The multilayer capacitor as set forth in claim 1, wherein each of said first terminal electrodes and said second terminal electrodes are formed on at least any one of a first side face parallel to said stacking direction and a second side face opposed to the first side face of said dielectric body.

5. The multilayer capacitor as set forth in claim 4, wherein each of said first terminal electrodes and said second terminal electrodes are formed straddling said first side face or said second side face, and a fifth side face and/or a sixth side face vertical to said stacking direction and adjacent to the first side face and the second side face of said dielectric body.

6. The multilayer capacitor as set forth in claim 5, wherein said first external conductor layer is connected with said first terminal electrode formed on said fifth side face and/or said sixth side face by a plurality of said pin hole conducting portions of said dielectric body placed between said first terminal electrode and said first external conductor layer; and said second external conductor layer is connected with said second terminal electrode formed on said fifth side face and/or said sixth side face by a plurality of said pin hole conducting portions of said dielectric body placed between said second terminal electrode and said second external conductor layer.

7. The multilayer capacitor as set forth in claim 6, wherein; in a plane direction vertical to said stacking direction, each of the first terminal electrode in said fifth side face and/or said sixth side face completely covers said first external conductor layer, which is adjacent to the first terminal electrode in said stacking direction, and connected to the first terminal electrode; and in a plane direction vertical to said stacking direction, each of the second terminal electrode in said fifth side face and/or said sixth side face completely covers said second external conductor layer, which is adjacent to the second terminal electrode in said stacking direction, and connected to the second terminal electrode.

8. The multilayer capacitor as set forth in claim 4, wherein each of said first terminal electrode completely covers said first internal conductor layer and said first external conductor layer exposed on said first side face or said second side face; and each of said second terminal electrode completely covers said second internal conductor layer and said second external conductor layer exposed on said first side face or said second side face.

9. The method for manufacturing multilayer capacitor as set forth in claim 1 comprising the steps of:

forming an internal layer green sheet;

forming said first internal conductor layer and said second internal conductor layer;

forming an internal layer stacking portion by alternately stacking said first internal conductor layer and said second internal conductor layer via said internal layer green sheet as mutually overlapping in said stacking direction;

forming an external layer green sheet having a plurality of pin holes;

forming pluralities of said first external conductor layers and said second external conductor layers;

forming a plurality of said pin hole conducting portions by filling a plurality of said pin holes with conductive material;

forming an external layer stacking portion by stacking a plurality of said first external conductor layer and said second external conductor layer via said, external layer green sheet in which said pin hole conducting portions are formed, without overlapping each other in said stacking direction;

forming a multilayer body by stacking said external layer stacking portion on at least any one of both end faces vertical to said stacking direction in said internal layer stacking portion;

forming a green chip by cutting predetermined dimension of said multilayer body;

forming said dielectric body by firing said green chip; and forming pluralities of said first terminal electrodes and said second terminal electrodes on said dielectric body.

10. The method for manufacturing the multilayer capacitor as set forth in claim 9 wherein said pin hole conducting portions are formed simultaneously with forming said first external conductor layer or said second external conductor layer on a surface of said external layer green sheet by stacking.

11. The method for manufacturing the multilayer capacitor as set forth in claim 9, wherein said internal layer stacking portion is formed continuously after forming said external layer stacking portion.

12. The method for manufacturing the multilayer capacitor as set forth in claim 9, wherein said external layer stacking portion is formed continuously after forming said internal layer stacking portion.

* * * * *